(12) United States Patent
Takayama (10) Patent No.: US 7,253,910 B2
(45) Date of Patent: Aug. 7, 2007

(54) OPTICAL MEASURING DEVICE

(75) Inventor: Yasuharu Takayama, Kawsasaki (JP)

(73) Assignee: Mitutoyo Corporation, Kanagawa (JP)

( * ) Notice: Subject to any disclaimer, the term of this patent is extended or adjusted under 35 U.S.C. 154(b) by 98 days.

(21) Appl. No.: 11/168,670

(22) Filed: Jun. 29, 2005

(65) Prior Publication Data

US 2006/0017940 A1    Jan. 26, 2006

(51) Int. Cl.
   *G01B 11/02*   (2006.01)
   *G01N 21/86*   (2006.01)
(52) U.S. Cl. ............... 356/640; 356/639; 250/559.13; 250/559.24
(58) Field of Classification Search ............... 356/638, 356/639, 640; 250/559.12, 559.13, 559.22, 250/559.24, 224
   See application file for complete search history.

(56) References Cited

U.S. PATENT DOCUMENTS

| | | | | |
|---|---|---|---|---|
| 4,007,992 A | * | 2/1977 | Petrohilos et al. | 356/640 |
| 4,129,384 A | * | 12/1978 | Walker et al. | 356/640 |
| 4,198,165 A | * | 4/1980 | Kirschstein | 356/634 |
| 4,213,707 A | * | 7/1980 | Evans, Jr. | 356/640 |
| 4,260,260 A | * | 4/1981 | Letort et al. | 356/638 |
| 4,492,473 A | * | 1/1985 | Richter et al. | 356/640 |
| 4,521,112 A | * | 6/1985 | Kuwabara et al. | 356/621 |
| 4,778,271 A | * | 10/1988 | Kuwabara et al. | 356/640 |
| 5,311,291 A | * | 5/1994 | Cholet | 356/640 |
| 2002/0041381 A1 | | 4/2002 | Akishiba | |

FOREIGN PATENT DOCUMENTS

| JP | A 61-34407 | 2/1986 |
|---|---|---|
| JP | A 61-111447 | 5/1986 |
| JP | U 5-28914 | 4/1993 |
| JP | A 6-109432 | 4/1994 |
| JP | A 6-258035 | 9/1994 |
| JP | A 11-83448 | 3/1999 |

* cited by examiner

*Primary Examiner*—Roy M. Punnoose
(74) *Attorney, Agent, or Firm*—Oliff & Berridge, PLC (57) ABSTRACT

An optical measuring device capable of improving the precision of detection of contamination on a protective glass is disclosed. With threshold values as large as 90%, 50%, 10% of a peak value of a scan signal, measured values $Q_{90}$, $Q_{50}$, $Q_{10}$ of a dimension of a work to be measured are derived, respectively. It is determined whether a difference between the measured value $Q_{90}$ and the measured value $Q_{50}$ (or a variation of the measured value) is equal to or larger than a predetermined reference value. (B)-(D) show the presence of contamination on the protective glass, equal to or larger than the reference value. (A) shows the absence of contamination, lower than the reference value. It is then determined whether a difference between the measured value $Q_{50}$ and the measured value $Q_{10}$ is equal to or larger than a predetermined reference value. (D) shows the presence of thick contamination on the protective glass, equal to or larger than this reference value. Accordingly, a buzzer is driven and a red lamp is turned on to give the alarm to the operator to remove the contamination immediately.

13 Claims, 5 Drawing Sheets

OPTICAL MEASURING DEVICE

CROSS-REFERENCE TO RELATED APPLICATION

This application is based upon and claims the benefit of priority from the prior Japanese Patent Application No. 2004-214624, filed on Jul. 22, 2004, the entire contents of which are incorporated herein by reference.

BACKGROUND OF THE INVENTION

1. Field of the Invention

The present invention relates to an optical measuring device of a scanning type that uses a collimated beam.

2. Description of the Related Art

An optical measuring device comprises a projector and a photoreceptor located separately by a scan region in which a work to be measured locates. A collimated beam from the projector is employed to repeatedly scan the scan region and the photoreceptor receives the beam transmitted through the scan region to generate scanned signals. The scanned signals are specifically processed to indicate a measured value (such as a dimension and roundness of the work to be measured).

The projector and the photoreceptor contain expensive optical components (such as a semiconductor laser, photo-diodes, lenses and mirrors). To prevent contamination of and damage to the optical components, the projector and the photoreceptor are each provided with a cabinet that houses the optical components.

The cabinet has a window with a protective glass fitted therein. The collimated beam generated at the projector is led to the scan region in an external ambient after it transmits through the protective glass. The collimated beam transmitted through the scan region transmits through the protective glass and is led into the photoreceptor. The protective glass is exposed to the external ambient and accordingly easily contaminated and may be damaged occasionally. The contamination, for example, becomes an obstacle on measurements and cause increased measurement errors. A dimension-measuring device has therefore been proposed that can detect a foreign substance located on the optical path of the beam (JP-A11-83448, Paragraphs 0029-0043, FIGS. 2 and 3).

The present invention has an object to provide an optical measuring device capable of improving the precision of detection of an abnormality on the optical path of the beam.

SUMMARY OF THE INVENTION

The present invention provides an optical measuring device, which comprises a projector means operative to use a collimated beam derived from a beam emitted from a light-emitting element to repeatedly scan a scan region in which a work to be measured locates; a photoreceptor element operative to receive a beam transmitted through the scan region to provide a scanned signal; a binarized signal generator means configured to binarize the scanned signal with a plurality of different threshold values to generate a plurality of binarized signals; an arithmetic means operative to calculate on the basis of the binarized signals a measured value associated with the work to be measured; a decision means operative to compare a plurality of measured values calculated at the arithmetic means on the basis of the binarized signals to determine whether an abnormality arises on an optical path of the beam from the light-emitting element to the photoreceptor element; and a notice means operative to notice the abnormality if the decision means determines that the abnormality arises.

In the optical measuring device according to the present invention, when an abnormality arises on the optical path of the beam from the light-emitting element to the photoreceptor element, the abnormality is detected based on the fact that a difference occurs between measured values resulted from measurements with different threshold values. The abnormality is noticed when it is detected. In the optical measuring device according to the present invention, the number of the plurality of different threshold values may be three or more. The decision means compares measured values on each of combinations of the plurality of measured values to determine the degree of the abnormality, and the notice means provides different notices in accordance with the degree of the abnormality. In this case, as the content to be noticed is changed in accordance with the degree of the abnormality, the operator can know the degree of the abnormality easily.

In the optical measuring device according to the present invention, the generator means may include a threshold value switching circuit operative to switch among the plurality of threshold values. In this case, the circuit can be shared. This is particularly effective when a large number of threshold values are employed.

In the optical measuring device according to the present invention, it is also possible to indicate anyone of the plurality of measured values as a measured value. In this case, a certain threshold value for use in normal measurements can also be employed in detection of abnormality to simplify the configuration of the device by that extent.

In the present invention, when an abnormality arises on the optical path of the beam, the abnormality is detected based on the fact that a difference occurs between measured values resulted from measurements with different threshold values. Therefore, the precision of abnormality detection can be improved.

DETAILED DESCRIPTION OF THE INVENTION

An embodiment of the present invention will now be described in detail below with reference to the drawings.

[Configuration of Optical Measuring Device]

Figure 1:
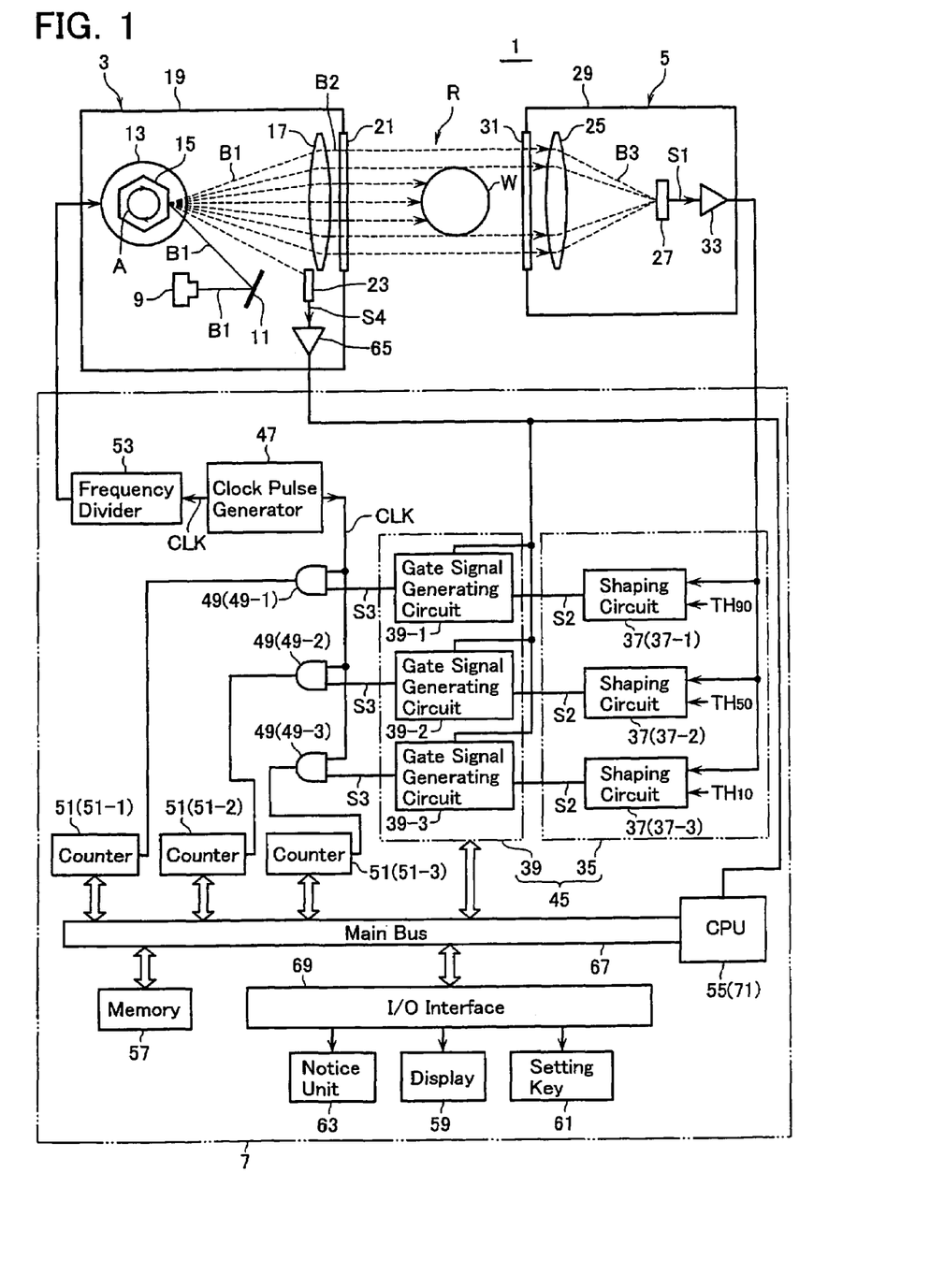
FIG. 1 is a block diagram illustrative of an optical measuring device according to the embodiment.

FIG. 1 is a block diagram illustrative of an optical measuring device 1 according to the embodiment. The device 1 comprises a projector 3, a photoreceptor 5 and a controller 7. The projector 3 opposes to the photoreceptor 5 with a scan region R sandwiched therebetween. The scan region R is a region located in an external ambient, which is employed to locate a work W to be measured. The controller 7 is connected to the projector 3 and the photoreceptor 5 through cables (not shown) to execute various controls required for measurements.

The projector 3 includes a light-emitting element 9 such as a semiconductor laser, and a mirror 11 operative to reflect a beam B1 emitted from the element 9. It also includes a polygon mirror 15 operative to receive the beam B1 reflected from the mirror 11 while it is rotated at a high speed by a motor 13 in the direction of the arrow A. It further includes a collimator lens 17 operative to convert the beam B1 reflected at the mirror 11 into a collimated beam B2. When the polygon mirror 15 rotates, the collimated beam B2 is radiated to scan the scan region R repeatedly.

These components contained in the projector 3 are housed in a cabinet 19. On one of sides of the cabinet 19 is provided a window with a protective glass 21 fitted therein, which opposes to the collimator lens 17. The collimated beam B2 transmits through the protective glass 21 and irradiates the scan region R therewith. The projector 3 further includes a timing photodiode 23, which is located outside the effective scan range of the beam B1 reflected from the polygon mirror 15 to detect the start or end of a scan and provide a timing signal S4. The timing signal S4 is amplified thorough an amp 65 and fed into a CPU 55 and a gate signal generator 39, which are described later.

The photoreceptor 5 includes a condenser lens 25 operative to receive the collimated beam B2 transmitted through the scan region R, and a photoreceptor element 27 operative to receive a beam B3 condensed through the condenser lens 25 and provide a scanned signal S1. It also includes an amp 33 operative to amplify the scanned signal S1. The photoreceptor element 27 may comprise a photodiode, for example. The condenser lens 25, the photoreceptor element 27 and the amp 33 are housed in a cabinet 29. On one of sides of the cabinet 29 is provided a window with a protective glass 31 fitted therein, which opposes to the condenser lens 25. The collimated beam B2 transmitted through the scan region R transmits through the protective glass 31 and enters the condenser lens 25.

The following description is given to the controller 7. The controller 7 includes a shaping unit 35 operative to shape the scanned signal S1 amplified through the amp 33 and provide a shaped signal S2. The shaping unit 35 has three shaping circuits (specifically, comparator circuits) 37. The shaping circuit 37-1 shapes the scanned signal S1 with reference to a threshold value ($TH_{90}$) as large as 90% of a peak value of the scanned signal S1. Similarly, the shaping circuit 37-2 shapes the scanned signal S1 with reference to a threshold value ($TH_{50}$) as large as 50%, and the shaping circuit 37-3 with reference to a threshold value ($TH_{10}$) as large as 10%.

The controller 7 includes gate signal generating circuits 39 operative to select an edge of the shaped signal S2 based on the timing of the timing signal S4 and generate a binarized signal S3 or a gate signal. There are three gate signal generating circuits 39, and the circuits 39-1, 39-2, 39-3 correspond to the shaping circuit 37-1, 37-2, 37-3, respectively. The shaping unit 35 and the gate signal generating circuits 39 configure a generator 45 operative to binarize the scanned signal with a plurality of different threshold values to generate a plurality of binarized signals corresponding to the respective threshold values.

The controller 7 comprises a clock pulse oscillator 47, three AND circuits 49 and three counters 51. The AND circuits 49 and the counters 51 are provided corresponding to the respective shaping circuits 37. Each binarized signal S3 is fed to one of input terminals of the corresponding AND circuit 49. The clock pulses CLK generated at the oscillator 47 are fed to the other of the input terminals of the AND circuit 49. An output from the AND circuit 49 is supplied to the corresponding counter 51. The controller 7 also comprises a frequency divider 53 operative to receive the clock pulses from the clock pulse oscillator 47. An output from the frequency divider 53 is employed in rotational synchronization of the motor 13.

The controller 7 further comprises a CPU 55 operative to execute various controls required for measurements, and a memory 57 operative to store various data and so forth required for measurements. It also comprises a display 59 operative to indicate a measured value and so forth, a setting-key 61 operative to input various settings required for measurements, and a notice unit 63 operative to notice an abnormality when the abnormality arises on the optical path of the beam.

The CPU 55, the memory 57, the gate signal generating circuits 39 and the three counters 51 are connected with each other over a main bus 67. The display 59, the setting key 61 and the notice unit 63 are connected via an I/O interface 69 to the main bus 67.

[Measurement by Optical Measuring Device]

Figure 2:
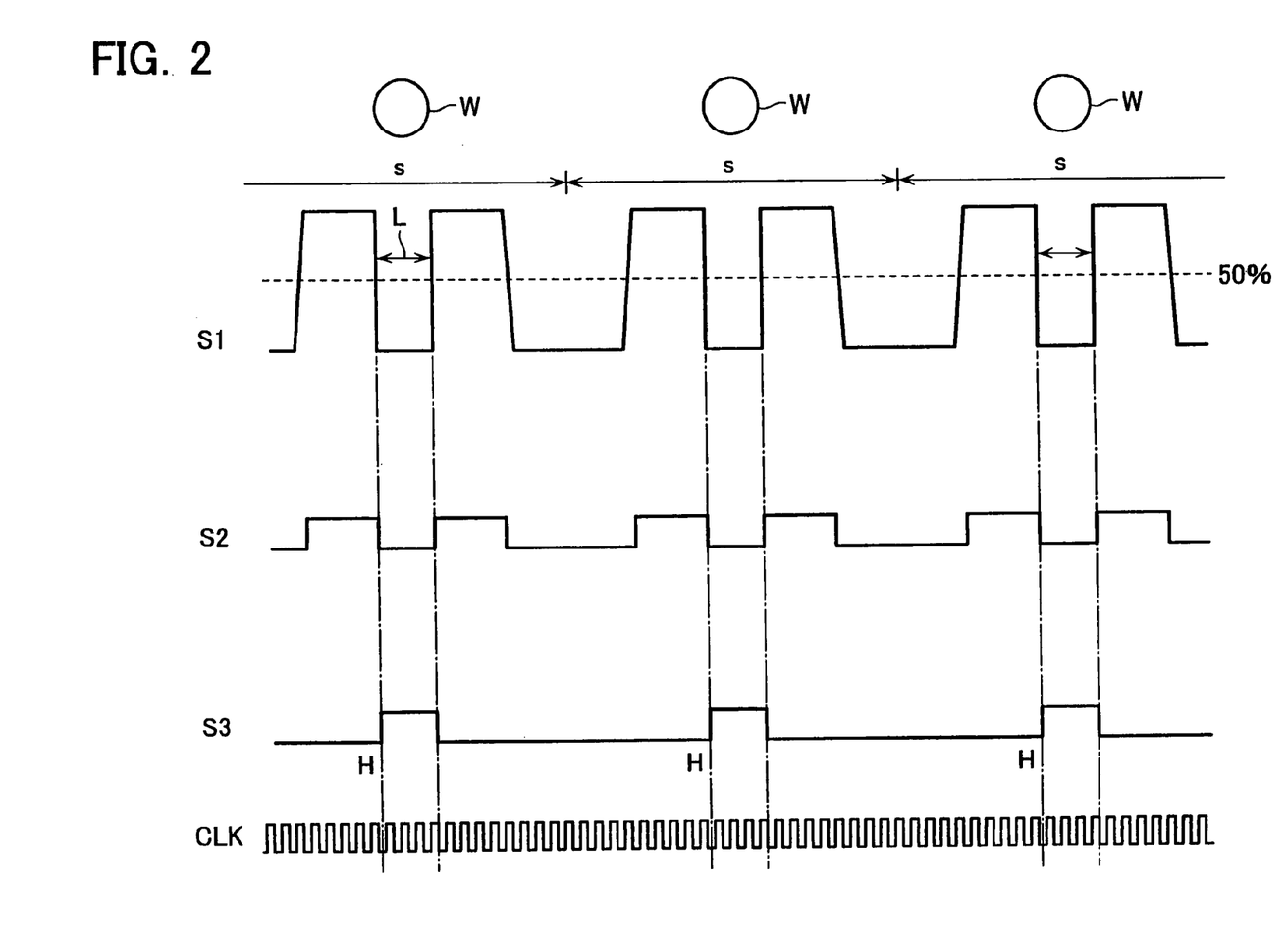
FIG. 2 is a timing chart illustrative of measurement of a work to be measured using the optical measuring device according to the embodiment.

The optical measuring device 1 is employed to obtain a measured value about a dimension of the work W (such as a diameter of the work W) in operation, which is described with reference to FIGS. 1 and 2. FIG. 2 is a timing chart illustrative of the measurement. The light-emitting element 9 is first caused to emit the beam B1 while the polygon mirror 15 rotates at a high speed in synchronization with the clock pulses CLK. The beam B1 is reflected at the polygon mirror 15 and turned into the collimated beam B2 through the collimator lens 17. The collimated beam B2 is employed to repeatedly scan the scan region R in which the work W locates.

The light transmitted through the scan region R is condensed through the condenser lens 25 and received at the photoreceptor element 27. As a result, the photoreceptor element 27 provides the scanned signal S1. As the photoreceptor element 27 is obstructed by the work W, the scanned signal S1 has a corresponding waveform. In FIG. 2 the character s denotes a scanned signal output during a scan. A low-voltage section L corresponds to the diameter of the work W.

The scanned signal S1 is amplified through the amp 33 and fed into each shaping circuit 37 while the binarized signal generated with the threshold value 50% (an example of the certain threshold value) is employed for measurements. Accordingly, processing of the scanned signal S1 fed to the shaping circuit 37-2 is described hereinafter.

When the scanned signal S1 is fed to the shaping circuit 37-2, the shaped signal S2 shaped with the threshold value 50% is output. On the basis of the signal S2, the gate signal generating circuit 39-2 generates the binarized signal S3 or the gate signal. The signal S3 and the clock pulses CLK are supplied to the AND circuit 49-2. As a result, the clock pulses CLK pass through the AND circuit 49-2 during the "H" period of the binarized signal S3 and are counted at the counter 51-2. In other words, the clock pulses CLK are counted during a period in which the beam B3 can not be received because the photoreceptor element 27 is obstructed by the work W. The count of pulses is employed to calculate a measured value (a diameter of the work W in this example) at the CPU 55. As the scan region R is scanned repeatedly, an averaged value of data obtained through several scans is indicated on the display 59 as the measured value.

[Detection of Contamination]

Contamination may be present on the protective glass 21, 31 (an example of the abnormality arising on the optical path of the beam from the light-emitting element 9 to the photoreceptor element 27). In this embodiment, the contamination is detected based on the fact that a difference occurs between measured values resulted from measurements with different threshold values. The contamination is noticed when it is detected. A detailed description is given below.

FIG. 3 is a waveform diagram showing relations between the scanned signal S1 and contamination on the protective glass. A disturbed section E in the waveform indicates the presence of contamination. The width of the section E, large and small, corresponds to the area of contamination. A large width of the section E indicates a large area of contamination, and a small width indicates a small area. On the other hand, the depth of the section E, large and small, corresponds to the density of contamination. A large depth of the section E indicates thick contamination, and a small depth indicates thin contamination.

Figure 3A:
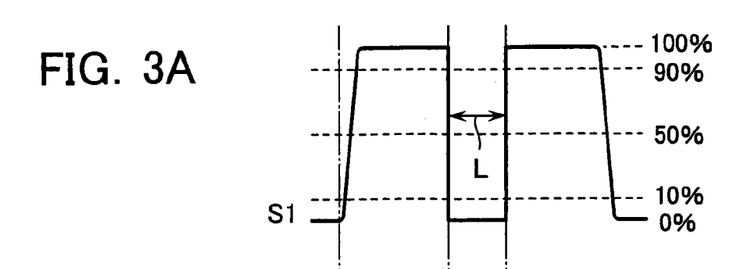
FIGS. 3A-3D are waveform diagrams showing relations between a scanned signal and contamination on a protective glass.
Figure 3B:
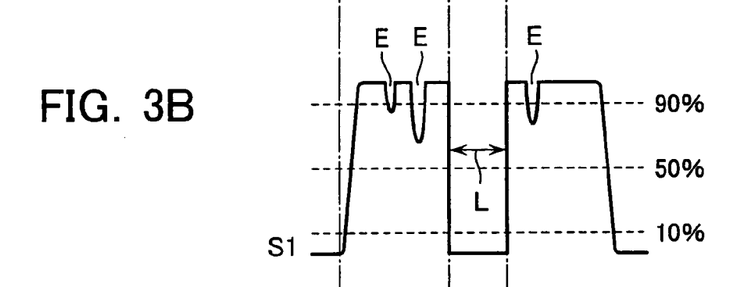
Figure 3C:
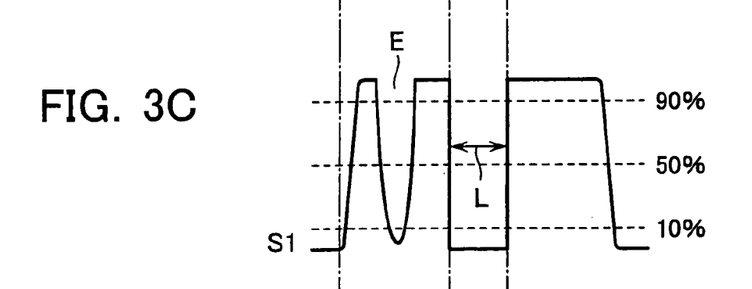
Figure 3D:
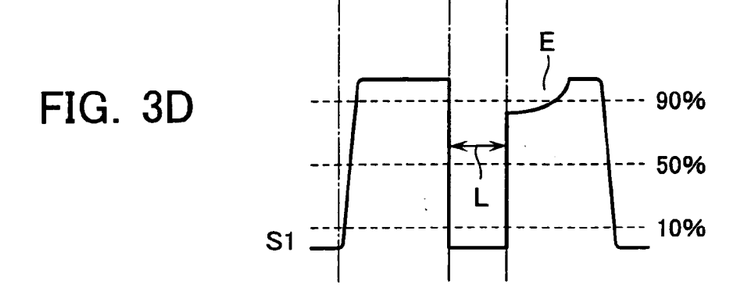

FIG. 3A shows a waveform in the absence of contamination. FIG. 3B shows a waveform in the presence of a plurality of small areas contaminated thin. FIG. 3C shows a waveform in the presence of a single middle area contaminated thick. FIG. 3D shows a waveform in the presence of a single large area contaminated thin, partly overlapping the work W. As shown in FIG. 3A, in the absence of contamination, a difference hardly occurs between measured values resulted from measurements even if the threshold value is changed. To the contrary, as shown in FIGS. 3B-3D, in the presence of contamination, a difference occurs between measured values resulted from measurements with different threshold values as a result of the shaped signal S2 shown in FIG. 2 suffering the influence. The presence of contamination disturbs the waveform of the scanned signal S1. The cause of disturbance is described with reference to the example of FIG. 3C.

The scanned signal S1 is generally shaped with the threshold value 50%. Falling out of this value causes in a measured value an error in proportion to the beam diameter. In order to reduce the error, the beam diameter is minimized at the location of the work W. Thus, in the absence of contamination as shown in FIG. 3A, no difference arises between measured values even if the threshold value is changed. On the other hand, the beam diameter is larger at the location of the protective glass. Therefore, in the presence of contamination as shown in FIG. 3C, the measured values greatly differ if the threshold value is changed for measurements.

Specifically describing the beam diameter, in general, the work W is located at the focal position of the collimator lens 17 and the beam is focused in as thin as possible. Therefore, the beam diameter is equal to 0.1 mm at the location of the work W. To the contrary, the beam diameter is equal to 2 mm at the location of the protective glass 21, 31.

Thus, in the presence of contamination on the protective glass 21 or the protective glass 31, the measured value varies depending on the degree of the contamination (the area, large and small, and the density, large and small). This fact is employed in this embodiment to detect contamination.

Figure 4:
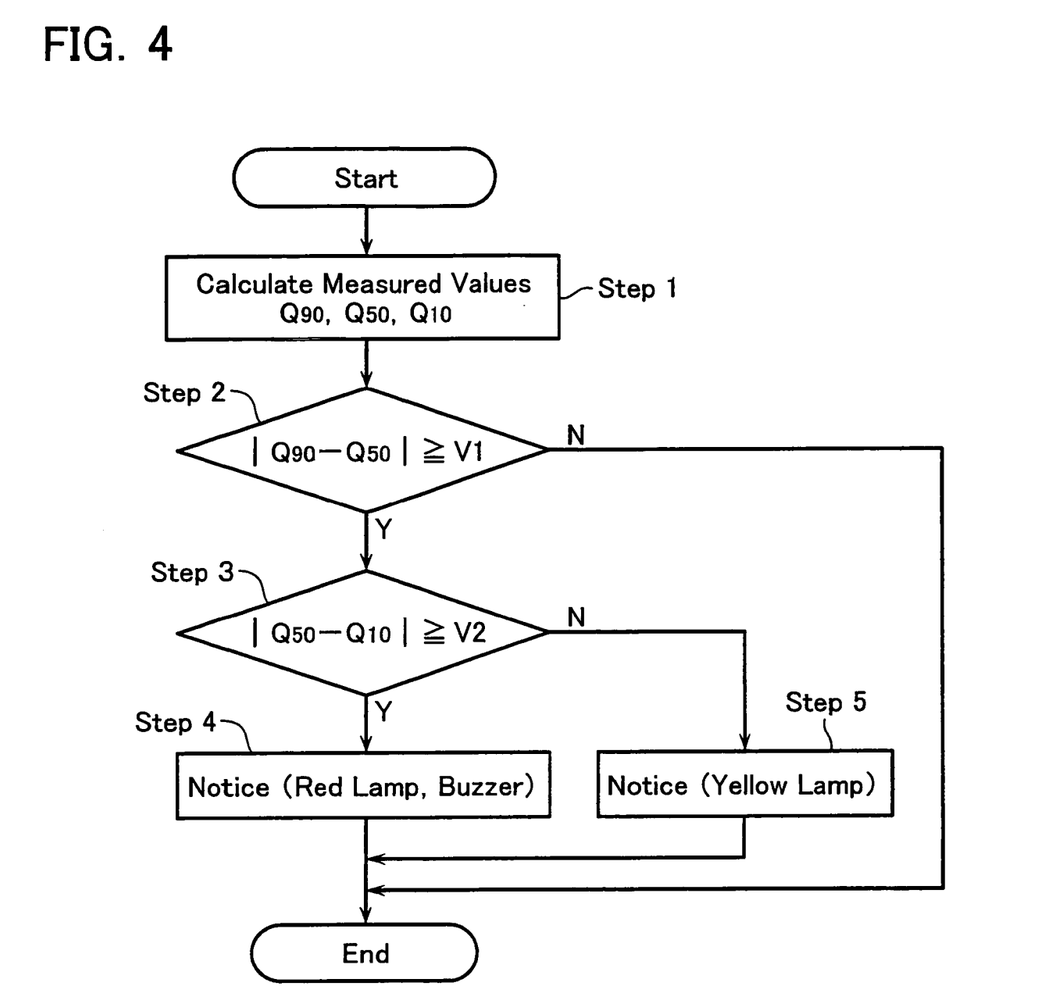
FIG. 4 is a flowchart illustrative of a contamination detecting process according to the embodiment.

Detection of contamination in this embodiment is described with reference to FIGS. 1-4. FIG. 4 is a flowchart illustrative of a contamination detecting process according to the embodiment. First, measured values $Q_{90}$, $Q_{50}$, $Q_{10}$ of a dimension are calculated with reference to the threshold values 90%, 50%, 10%, respectively (Step 1). This step is described in detail.

As shown in FIG. 1, in the embodiment, the measured value $Q_{50}$ is derived with the threshold value 50%. At the same time, the measured value $Q_{90}$ in the case of the threshold value 90% and the measured value $Q_{10}$ in the case of the threshold value 10% are also derived. In a word, the scanned signal S1 is fed into the shaping circuits 37-1, 37-3 as well as the shaping circuit 37-2 simultaneously. Then, as in the processing with the threshold value 50%, the shaping circuits 37-1, 37-3 generate the shaped signal S2, and the gate signal generating circuits 39-1, 39-3 generate the binarized signal S3. Thereafter, the AND circuits 49-1, 49-3 pass the clock pulses CLK therethrough during the "H" period of the binarized signal S3, and the pulses are counted in the counters 51-1, 51-3. On the basis of the count, the measured values $Q_{90}$, $Q_{10}$ are calculated in the CPU 55.

Next, at the step 2, the CPU 55 determines whether the absolute value of a difference between the measured value $Q_{90}$ and the measured value $Q_{so}$ (or a variation of the measured value) is equal to or larger than a predetermined reference value V1. The reference value V1 is determined by deriving measured values from different degrees of contamination (the area, large and small, and the density, large and small) and, on the basis of the measured values, verifying relations between the contamination and the variation of the measured value.

If the absolute value is equal to or larger than the reference value V1, the presence of contamination on the protective glass as shown in FIGS. 3B-3D is determined. In this case, it may concern any of FIGS. 3B-3D possibly. On the other hand, if the absolute value is smaller than the reference value V1, the absence of contamination on the protective glass is determined, and the process is terminated.

When the presence of contamination on the protective glass is determined at the step 2, the process goes to the step 3. It is determined at this step whether the absolute value of a difference between the measured value $Q_{50}$ and the measured value $Q_{10}$ is equal to or larger than a predetermined reference value V2. The reference value V2 is determined as is the reference value V1. In this embodiment, the reference value V1 and the reference value V2 are the same value (for example, 0.5 mm) though they may be different. If the absolute value of a difference between the value $Q_{50}$ and the value $Q_{10}$ is equal to or larger than the reference value V2, the presence of thick contamination as shown in FIG. 3C is determined. This contamination exerts a large ill effect on measurements. Accordingly, at the step 4, a buzzer is driven and a red lamp is turned on in the notice unit 63 of FIG. 1 to give the alarm to the operator to remove the contamination immediately.

If the absolute value of a difference between the value $Q_{50}$ and the value $Q_{10}$ is smaller than the reference value V2, the presence of thin contamination as in FIG. 3B or FIG. 3D is determined. The contamination of this kind can not exert a large ill effect on measurements though, preferably, the contamination is removed in the hope of improving the precision of measurements. Therefore, at the step 5, a yellow lamp in the notice unit 63 is turned on to attract the attention of the operator. The processes in the steps 1, 2, 3 are executed in the CPU 55 of FIG. 1. Therefore, the CPU 55 serves as a decision unit 71 operative to compare a plurality of measured values calculated on the basis of a plurality of binarized signals and determine whether the protective glass is contaminated or not.

As described above, in this embodiment, contamination on the protective glass is detected based on the fact that different threshold values result in different measured values in the presence of contamination on the protective glass 21 or the protective glass 31, and if contamination is present it is noticed. The detection of contamination may also be achieved, as shown in FIG. 3B, by counting contaminated portions with respect to the threshold values 50%, 90% and comparing them.

In such the case, however, when the disturbed section E in the waveform overlaps the low-voltage section L, as shown in FIG. 3D, no contaminated portion is counted and accordingly contamination can not be detected. In the presence of a single thick contaminated portion, as shown in FIG. 3C, the number of contaminated portion is always equal to one even if the threshold value is changed, and accordingly contamination can not be detected. To the contrary, as the embodiment is based on the fact that different threshold values result in different measured values, contamination can be detected even in the states as shown in FIGS. 3C, 3D. Therefore, the embodiment is capable of improving the precision of detection of contamination on the protective glass.

In the embodiment, with respect to a combination of the measured value $Q_{90}$ and the measured value $Q_{50}$, and a combination of the measured value $Q_{50}$ and the measured value $Q_{10}$, the measured values are compared to determine the degree of contamination. If the contamination is thick, the notice buzzer and the notice lamp of red are employed to notice it. If the contamination is thin, the notice lamp of yellow is employed to notice it. As describe above, the content to be noticed is changed in accordance with the degree (the developed extent) of contamination. Therefore, the operator can easily know the degree of contamination, which can be employed for reference on maintenance of the protective glass and for diagnosis of the cleaned condition on the protective glass.

The above description has been given to the case where the number of the threshold values is equal to three (10%, 50%, 90%) though the number of the threshold values is not limited to three but may be equal to at least two or more instead. The threshold value 50% may be employed in calculations of normal measured values. Therefore, the use of the threshold value 50% in detection of contamination can reduce the number of other threshold values for use in detection of contamination and accordingly reduce the numbers of the shaping circuits 37 and the counters 51 by that extent.

The magnitudes of the threshold values are not limited to 10%, 50%, 90% but may be other values than these. As shown in FIGS. 3B-3D, the thinner the contamination, the higher the detectable threshold value becomes. Therefore, the use of a low threshold value (for example, 10%), a high threshold value (for example, 90%) and a plurality of middle threshold values (for example, 30%, 50%, 70%) can distinguish the degrees of the density of contamination much finer.

The reference values V1, V2 differ depending on models of the optical measuring device. The reference values V1, V2 may be previously stored in a memory 57 of the optical measuring device or otherwise may be input by the operator. The operator may also alter the magnitudes of the reference values V1, V2.

The above description has been given to the example of the contamination on the protective glass 21, 31. When the protective glass is damaged, the damage can be detected because a difference occurs between measured values, like in the case of contamination. If there is an abnormality on the optical path of the beam from the light-emitting element 9 to the photoreceptor element 27, the abnormality can be detected because a difference occurs between measured values as in the case of the protective glass.

The present invention is also applicable to a device for measuring a work by focusing a projected image of the work onto a CCD element and adjusting the threshold value for the signal output from the CCD element.

Figure 5:
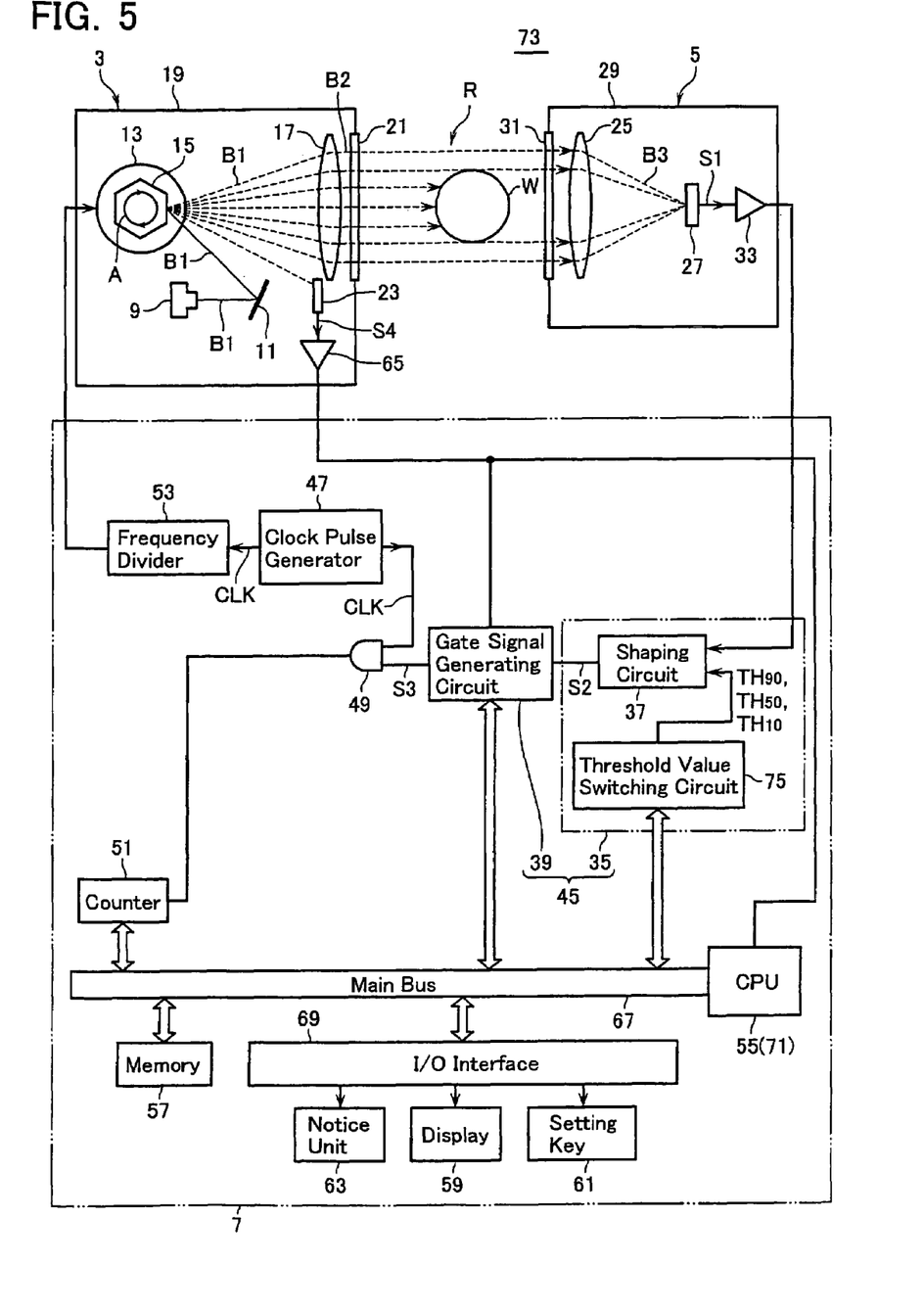
FIG. 5 is a block diagram illustrative of a modification of the optical measuring device according to the embodiment.

Finally, a modification of the optical measuring device according to the present invention is described. FIG. 5 is block diagram illustrative of this device 73. In FIG. 5, the same parts as those denoted with the reference numerals in FIG. 1 are given the same reference numerals and omitted from the following description.

In the device 1 shown in FIG. 1, the shaping circuits 37 and the counters 51 are provided for the threshold values 10%, 50%, 90%, respectively. To the contrary, the device 73 shown in FIG. 5 includes a switching circuit 75 operative to switch among the threshold values in the shaping circuit 37. Therefore, the shaping circuit 37 and the counter 51 can be employed commonly to simplify the circuit. This is particularly effective when a large number of threshold values are employed.

In the configuration of FIG. 5, measured values are calculated with the threshold value 90% for the first signal s (the scanned signal output during a scan), the threshold value 50% for the second signal s, the threshold value 10% for the third signal s, the threshold value 90% for the fourth signal s, not shown. To achieve this, based on the timing signal S4 from the timing photodiode 23, the CPU 55 controls the threshold value switching circuit 75.

What is claimed is:

1. An optical measuring device, comprising:
   a projector means operative to use a collimated beam derived from a beam emitted from a light-emitting element to repeatedly scan a scan region in which a work to be measured locates;
   a photoreceptor element operative to receive a beam transmitted through said scan region to provide a scanned signal;
   a binarized signal generator means configured to binarize said scanned signal with a plurality of different threshold values to generate a plurality of binarized signals;
   an arithmetic means operative to calculate on the basis of said binarized signals a measured value associated with said work to be measured;
   a decision means operative to compare a plurality of measured values calculated at said arithmetic means on the basis of said binarized signals to determine whether an abnormality arises on an optical path of said beam from said light-emitting element to said photoreceptor element; and
   a notice means operative to notice said abnormality if said decision means determines that said abnormality arises.

2. The optical measuring device according to claim 1, wherein the number of said plurality of different threshold values for use in said binarized signal generator means is three or more,
   wherein said decision means compares measured values on each of combinations of said plurality of measured values to determine the degree of said abnormality, and
   wherein said notice means provides different notices in accordance with the degree of said abnormality.

3. The optical measuring device according to claim 1, wherein said binarized signal generator means includes a threshold value switching circuit operative to switch among said plurality of threshold values.

4. The optical measuring device according to claim 1, further comprising a display operative to indicate any one of said plurality of measured values as a measured value.

5. The optical measuring device according to claim 1, wherein said projector means includes a polygon mirror held rotatably and configured to use light from said light-emitting element for scanning, and a collimator lens configured to convert light reflected from said polygon mirror into said collimated light.

6. The optical measuring device according to claim 1, wherein said plurality of different threshold values for use in said binarized signal generator means are at least three or more, including a first threshold value, a second threshold value smaller than said first threshold value, and a third threshold value smaller than said second threshold value,
   wherein said decision means executes a first decision on whether a difference between a measured value obtained with said first threshold value and a measured value obtained with said second threshold value is equal to or larger than a reference value, and executes a second decision on whether a difference between a measured value obtained with said second threshold value and a measured value obtained with said third threshold value is equal to or larger than a reference value, and
   wherein said notice means provides a first notice if both said first decision and said second decision are positive, and provides a second notice if only said first decision is positive.

7. The optical measuring device according to claim 6, further comprising a memory to store said reference value.

8. The optical measuring device according to claim 1, further comprising a condenser lens for condensing said collimated light,
   wherein said photoreceptor receives light condensed through said condenser lens.

9. The optical measuring device according to claim 1, further comprising a detector means operative to detect the start or end of a scan in said scan region by said projector means and provide a timing signal,
   wherein said binarized signal generator means selects on the basis of said timing signal an edge of a shaped signal shaped with said threshold value to generate said binarized signal.

10. The optical measuring device according to claim 1, further comprising a detector means operative to detect the start or end of a scan in said scan region by said projector means and provide a timing signal,
    wherein said binarized signal generator means includes a threshold value switching circuit operative to switch among said plurality of threshold values, said threshold value switching circuit operative to switch among said plurality of threshold values based on said timing signal.

11. An abnormality detecting method operative to detect an abnormality in an optical measuring device, said optical measuring device comprising:
    a projector means operative to use a collimated beam derived from a beam emitted from a light-emitting element to repeatedly scan a scan region in which a work to be measured locates;
    a photoreceptor element operative to receive a beam transmitted through said scan region to provide a scanned signal;
    a binarized signal generator means configured to binarize said scanned signal to generate a binarized signal; and
    an arithmetic means operative to calculate on the basis of said binarized signal a measured value associated with said work to be measured,
    said method comprising:
    a binarized signal generating step generating in said binarized signal generator means a plurality of binarized signals using a plurality of threshold values,
    a decision step comparing a plurality of measured values calculated on the basis of each of a plurality of said binarized signals to determine whether an abnormality arises on an optical path of said beam from said light-emitting element to said photoreceptor element; and
    a notice step noticing said abnormality by outputting a notice signal indicating that said abnormality arises.

12. The abnormality detecting method according to claim 11, wherein the number of said plurality of different threshold values for use in said binarized signal generator means is three or more,
    wherein said decision step compares measured values on each of combinations of said plurality of measured values to determine the degree of said abnormality, and
    wherein said notice step provides different notices in accordance with the degree of said abnormality.

13. The abnormality detecting method according to claim 11, wherein said plurality of different threshold values for use in said binarized signal generator means are at least three or more, including a first threshold value, a second threshold value smaller than said first threshold value, and a third threshold value smaller than said second threshold value,
    wherein said decision step executes a first decision on whether a difference between a measured value obtained with said first threshold value and a measured value obtained with said second threshold value is equal to or larger than a reference value, and executes a second decision on whether a difference between a measured value obtained with said second threshold value and a measured value obtained with said third threshold value is equal to or larger than a reference value, and
    wherein said notice step provides a first notice if both said first decision and said second decision are positive, and provides a second notice if only said first decision is positive.

* * * * *